United States Patent
Takaki et al.

(10) Patent No.: US 12,106,467 B2
(45) Date of Patent: Oct. 1, 2024

(54) INSPECTION APPARATUS AND INSPECTION METHOD FOR COKE OVEN CONSTRUCTION, AND COKE OVEN CONSTRUCTION METHOD

(71) Applicant: JFE STEEL CORPORATION, Tokyo (JP)

(72) Inventors: Yuki Takaki, Tokyo (JP); Junichi Yotsuji, Tokyo (JP); Taku Watanabe, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 274 days.

(21) Appl. No.: 17/598,062

(22) PCT Filed: Mar. 24, 2020

(86) PCT No.: PCT/JP2020/013036
§ 371 (c)(1),
(2) Date: Sep. 24, 2021

(87) PCT Pub. No.: WO2020/196527
PCT Pub. Date: Oct. 1, 2020

(65) Prior Publication Data
US 2022/0254010 A1 Aug. 11, 2022

(30) Foreign Application Priority Data
Mar. 26, 2019 (JP) .................................. 2019-058447

(51) Int. Cl.
*G06K 9/00* (2022.01)
*G06T 7/00* (2017.01)
(Continued)

(52) U.S. Cl.
CPC ............. *G06T 7/0006* (2013.01); *G06T 7/215* (2017.01); *G06T 7/73* (2017.01); *G06V 20/64* (2022.01);
(Continued)

(58) Field of Classification Search
CPC ......... G06T 7/0006; G06T 7/215; G06T 7/73; G06T 2207/10016; G06T 2207/30132;
(Continued)

(56) References Cited

U.S. PATENT DOCUMENTS 7,174,787 B2 * 2/2007 Sadri ...................... F27D 19/00
73/602
11,237,124 B2 * 2/2022 Richter .................. F27D 21/02
(Continued)

FOREIGN PATENT DOCUMENTS

| CN | 201680823 U | 12/2010 |
| CN | 105644124 A | 6/2016 |

(Continued)

OTHER PUBLICATIONS

Jun. 16, 2020 International Search Report issued in International Patent Application No. PCT/JP2020/013036.
(Continued)

*Primary Examiner* — Shervin K Nakhjavan
(74) *Attorney, Agent, or Firm* — Oliff PLC

(57) ABSTRACT

An inspection apparatus for coke oven construction that is configured to check accuracy after refractories are laid in oven construction work for updating or newly creating a coke oven that produces coke. The inspection apparatus includes an image capturing device configured to acquire an image of a work area where oven construction work is in progress, measurement region determining means configured to identify a work-completed area where laying work has been completed on the basis of the image of the work (Continued)

area acquired by the image capturing device, and determine the identified work-completed area as a measurement region, and a refractory position measuring device configured to check laying accuracy by measuring positions of laid refractories in the measurement region determined by the measurement region determining means.

17 Claims, 5 Drawing Sheets

(51) Int. Cl.
*G06T 7/215* (2017.01)
*G06T 7/73* (2017.01)
*G06V 20/64* (2022.01)

(52) U.S. Cl.
CPC ............. *G06T 2207/10016* (2013.01); *G06T 2207/30132* (2013.01); *G06V 2201/06* (2022.01)

(58) Field of Classification Search
CPC . G06T 2207/10021; G06T 2207/10028; G06T 2207/20021; G06T 7/0004; G06V 20/64; G06V 2201/06; G01S 17/89; C10B 45/00; C10B 29/02; G01B 11/2518; G01B 11/2545
See application file for complete search history.

(56) References Cited

U.S. PATENT DOCUMENTS

| | | | |
|---|---|---|---|
| 2005/0263945 A1 | 12/2005 | Kirchhoff et al. | |
| 2019/0219389 A1* | 7/2019 | Gaillet | F27D 21/02 |

FOREIGN PATENT DOCUMENTS

| | | | | |
|---|---|---|---|---|
| CN | 105778934 A | | 7/2016 | |
| CN | 205426167 U | | 8/2016 | |
| CN | 107064149 A | | 8/2017 | |
| CN | 108871210 B | * | 5/2020 | ............. G01B 11/06 |
| EP | 1167919 B1 | * | 10/2005 | ......... F27D 21/0021 |
| JP | 2000-180162 A | | 6/2000 | |
| JP | 2001003058 A | * | 1/2001 | |
| JP | 2009521630 A | * | 6/2009 | ............ B25J 9/1687 |
| JP | 6008071 B1 | | 10/2016 | |
| JP | 2018-111804 A | | 7/2018 | |
| JP | 2018-136285 A | | 8/2018 | |
| JP | 2019-123784 A | | 7/2019 | |
| JP | 2019-184225 A | | 10/2019 | |
| WO | 2018002900 A1 | | 1/2018 | |

OTHER PUBLICATIONS

Jul. 3, 2023 Office Action issued in Korean Patent Application No. 10-2021-7030005.
Oct. 28, 2023 Office Action issued in Chinese Patent Application No. 202080024310.0.
Jin Rui et al. "Building construction enterprise BMI application basic course", Gongshang University Press, pp. 114-115, May 31, 2016.
Fan Jinzhu "Several Main Technical Problems Must Be Solved In Order To Ensure The Quality Of Masonry In Coke Oven", Inner Mongolia Science and Technology and Economy, No. 16, pp. 95-96, Aug. 31, 2011.
Nov. 27, 2020 Office Action issued in Taiwanese Patent Application No. 109110080.
Jul. 7, 2021 Office Action issued in Taiwanese Patent Application No. 109110080.
Feb. 16, 2022 Extended Search Report issued in European Patent Application No. 20776784.9.
Mar. 29, 2024 Office Action issued in Chinese Patent Application No. 202080024310.0 (with partial translation).
Aug. 5, 2024 Office Action issued in Chinese Patent Application No. 202080024310.0 (with partial translation).

* cited by examiner

STEP 1: ACQUIRE IMAGE OF WORK AREA

STEP 2: FLOW LINE ANALYSIS

STEP 3: AUTOMATICALLY MOVE 3D SCANNER TO LAYING-WORK-COMPLETED AREA

STEP 4: CHECK LAYING ACCURACY WITH 3D SCANNER

INSPECTION APPARATUS AND INSPECTION METHOD FOR COKE OVEN CONSTRUCTION, AND COKE OVEN CONSTRUCTION METHOD

TECHNICAL FIELD

This application relates to an inspection apparatus and an inspection method for coke oven construction, and also relates to a coke oven construction method using the inspection apparatus and the inspection method.

BACKGROUND

Metallurgical coke used in steelmaking is produced by carbonizing coal in a chamber coke oven. The chamber coke oven has carbonization chambers and firing chambers that supply heat to the carbonization chambers. The carbonization chambers and the firing chambers are alternately arranged in the oven width direction to form the chamber coke oven. Heat is supplied from the firing chambers to the carbonization chambers through refractories, such as refractory bricks, which separate adjacent ones of the carbonization and firing chambers. Some chamber coke ovens have a hundred or more oven chambers. Such chamber coke ovens, which are as large as 100 m or more in overall length and 10 m or more in height, may be regarded as very large brick structures.

Refractories constituting a coke oven are gradually damaged, because they are subjected not only to high temperatures exceeding 1000° C., but also to friction caused by horizontally pushing out coke obtained by carbonizing coal. The coke oven is used while being repaired by a simple process, such as thermal spraying, or by laying some refractories again mainly at the oven entrance. Coke ovens are generally said to have a life of 40 to 50 years. Aging coke ovens need to be updated or replaced with new ones.

Construction of a coke oven (oven construction) is typically carried out by oven construction workers by manually laying shaped refractories, such as bricks. For example, the work process is carried out in the following way.

A coke oven has a complex structure, but is designed such that the mating surfaces of upper and lower shaped refractories are horizontal and level with each other throughout the structure. The shaped refractories are laid in the first layer, second layer, and so on, in order from bottom to top. When a coke oven is newly created or a shaped refractory structure is updated, several dozen out of a total of several hundred oven construction workers are assigned to each predetermined range, so that one or two layers of shaped refractories per day are laid in order from the bottom of the oven.

In the technique described above, shaped refractories, such as bricks, are manually laid by oven construction workers at the coke oven construction site. Another technique which offers higher workability and efficiency than the aforementioned one, has also been proposed. In this technique, blocks are produced by laying a plurality of shaped refractories at a separate location from the coke oven construction site. The blocks are then transported to the coke oven construction site and installed (see, e.g., Patent Literature 1).

For either construction technique, it is required that shaped refractories be laid with a high degree of accuracy. The following techniques are used to lay shaped refractories, such as bricks, at the coke oven construction site with high accuracy. First, for example, by means of a crane, shaped refractories to be used are brought in at a work height in advance, and placed near construction points. Also, a mortar is produced by a kneading machine, put into a container, brought into the work area by means of for example a crane, and distributed in small quantities near the construction points. At a position where a shaped refractory is to be laid, an oven construction worker applies mortar with a trowel to a predetermined joint thickness, picks up a shaped refractory placed nearby, and lays the shaped refractory onto the mortar in such a manner as to prevent entry of air. After adjusting the position of the shaped refractory, for example, with a level guide, the oven construction worker horizontally moves it to the position where the next shaped refractory is to be laid. By repeating the process described above, a layer of shaped refractories is laid. After completion of laying work for one layer of shaped refractories, inspection work (shape measurement) is performed to check whether required accuracy is met. If a problem is found, the corresponding part is laid again to correct the problem. Then, laying work for the next layer begins.

The inspection work for checking whether the required accuracy is met involves, for example, stretching a string in a straight line to visually determine the distance to the string, or placing a straight rod of about 1 m against a row of laid shaped refractories to visually check for unevenness. If there is a gap of 2 mm or more, for example, the worker hits the corresponding area with a hammer for fine adjustment. If the adjustment fails, the corresponding bricks are removed and laid again. This inspection work is performed for each gate by workers, every time laying of the top layer in the oven height direction is completed. The inspection needs to be performed with a pitch of 1 mm across the length. The results of the inspection are filled in an inspection table.

CITATION LIST

Patent Literature

PTL 1: Japanese Patent No. 6008071

SUMMARY

Technical Problem

The manual inspection work described above is an extensive and very complex operation. Moreover, when the inspection work is performed at the coke oven construction site, the inspection work and the laying work need to take place at the same time. Working at the construction site where a plurality of workers come and go is inefficient, because it is necessary to avoid interference with workers working on other processes. That is, since there are workers with various roles at the oven construction site, the inspection work for checking whether required accuracy is met needs to be timed to avoid interference with other operations. This requires working while moving in a large area, and inevitably results in inefficient operation.

In the technique described in Patent Literature 1, blocks are produced by laying a plurality of shaped refractories at a separate location from the coke oven construction site. This technique improves work efficiency at the oven construction site, and also contributes to improved efficiency in that inspection work for checking whether required accuracy is met is performed at a separate location from the oven construction site. However, since the inspection work is not performed at the oven construction site, it may be difficult to satisfy required accuracy.

Accordingly, an object of the disclosed embodiments is to provide an inspection apparatus and an inspection method for coke oven construction that are capable of automatically performing inspection work after laying of refractories at an oven construction site, without interference with other processes, and to also provide a coke oven construction method.

Solution to Problem

To solve the problems described above, the disclosed embodiments provide (1) to (11) below.

(1) An inspection apparatus for coke oven construction, the inspection apparatus being an apparatus that checks laying accuracy after refractories are laid in oven construction work for updating or newly creating a coke oven that produces coke, the inspection apparatus including an image capturing device configured to acquire an image of a work area where oven construction work is in progress; measurement region determining means configured to identify a work-completed area where laying work has been completed on the basis of the image of the work area acquired by the image capturing device, the measurement region determining means being configured to determine the identified work-completed area as a measurement region; and a refractory position measuring device configured to check laying accuracy by measuring positions of laid refractories in the measurement region determined by the measurement region determining means.

(2) The inspection apparatus for coke oven construction according to (1), wherein the measurement region determining means performs flow line analysis on the image of the work area acquired by the image capturing device to identify the work-completed area and determine the measurement region.

(3) The inspection apparatus for coke oven construction according to (1) or (2), further including a moving mechanism configured to move the refractory position measuring device above the work area.

(4) The inspection apparatus for coke oven construction according to (3), wherein the moving mechanism is an overhead traveling crane.

(5) The inspection apparatus for coke oven construction according to any one of (1) to (4), wherein the refractory position measuring device is a 3D scanner.

(6) The inspection apparatus for coke oven construction according to any one of (1) to (5), wherein the refractory position measuring device measures a distance to an upper surface and/or a side surface of a laid refractory at multiple points to determine positions of laid refractories.

(7) An inspection method for coke oven construction, the inspection method being a method for checking laying accuracy after refractories are laid in oven construction work for updating or newly creating a coke oven that produces coke, the inspection method including the steps of acquiring an image of a work area where oven construction work is in progress; identifying a work-completed area where laying work has been completed on the basis of the image of the work area, and determining the identified work-completed area as a measurement region; and checking laying accuracy by measuring positions of laid refractories in the determined measurement region.

(8) The inspection method for coke oven construction according to (7), wherein the step of determining the measurement region performs flow line analysis on the image of the work area to identify the work-completed area.

(9) The inspection method for coke oven construction according to (8), wherein the step of determining the measurement region includes the steps of dividing the work area into a plurality of subareas; extracting flow lines of workers from the image of the work area; determining, from the extracted flow lines of workers, whether the subarea is the work-completed area or a work-in-progress area where laying work is in progress; and determining the work-completed area as the measurement region.

(10) The inspection method for coke oven construction according to (9), further including the steps of determining, as an inspection-completed area, the measurement region for which the checking of laying accuracy has been completed; and determining whether all the subareas in the work area are inspection-completed areas, wherein the measurement is terminated upon determining that all the subareas are inspection-completed areas.

(11) The inspection method for coke oven construction according to any one of (7) to (10), wherein the checking of laying accuracy involves using a refractory position measuring device configured to measure positions of laid refractories in the measurement region, and after the work-completed area is identified, the refractory position measuring device is moved to the identified work-completed area to check laying accuracy.

(12) The inspection method for coke oven construction according to any one of (7) to (11), wherein the checking of laying accuracy includes the steps of measuring positions of laid refractories in the measurement region to acquire measurement data; and comparing the measurement data to a design value to determine laying accuracy.

(13) A coke oven construction method for updating or newly creating a coke oven that produces coke, the coke oven construction method including repeating the steps of laying refractories; and checking laying accuracy of the laid refractories by using the inspection method according to any one of (7) to (12).

Advantageous Effects

In the disclosed embodiments, a measurement region to be subjected to measurement by the refractory position measuring device is determined on the basis of the image of the work area acquired by the image capturing device. Inspection work after laying refractories is thus automatically performed at the oven construction site without interference with other processes.

DETAILED DESCRIPTION

Disclosed embodiments will now be described with reference to the attached drawings.

Figure 1:
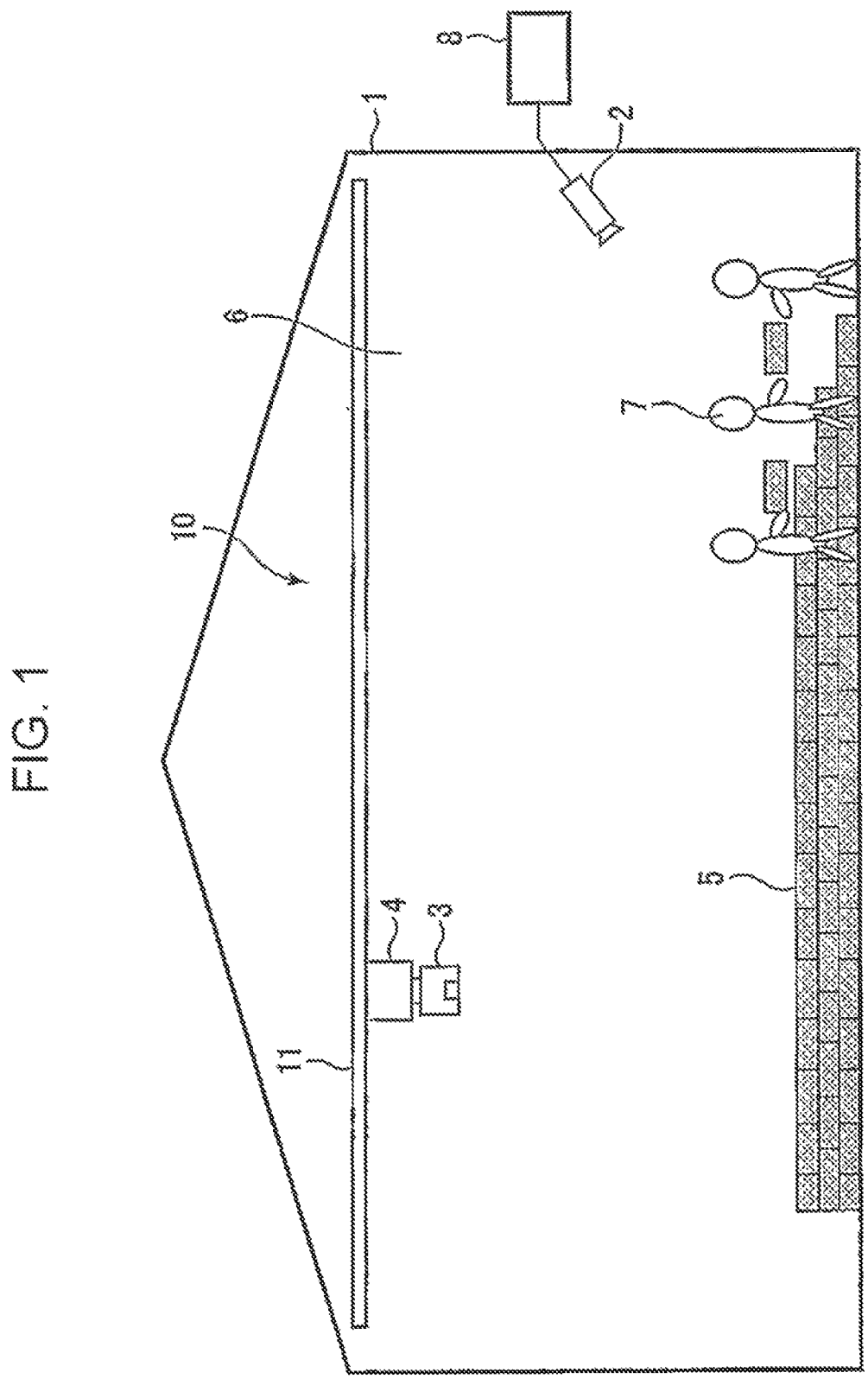
FIG. 1 is a diagram illustrating a coke oven construction facility that includes an inspection apparatus for coke oven construction according to an embodiment.

FIG. 1 is a diagram illustrating a coke oven construction facility that includes an inspection apparatus for coke oven construction according to an embodiment.

The coke oven construction facility includes an oven construction plant building 1. An image capturing device 2 and a refractory position measuring device 3 that constitute an inspection apparatus 10 are housed in the oven construction structure building 1. The image capturing device 2 is installed on a wall of the oven construction plant building 1.

A crane 4 is installed in the oven construction plant building 1, and the refractory position measuring device 3 is attached to the crane 4. The crane 4 is an overhead traveling crane that is horizontally movable along a rail 11. The crane 4 functions as a moving mechanism for moving the refractory position measuring device 3.

A work area 6 is below the refractory position measuring device 3 in the oven construction plant building 1. In the work area 6, refractories 5 are laid by workers 7 to construct a coke oven.

A main part of the coke oven has a structure in which a plurality of gates are arranged at predetermined intervals in the oven width direction. Each of the gates is formed by refractories 5 laid in the oven length direction and stacked in the height direction. The refractories 5 may either be shaped refractories, such as bricks, or monolithic refractories.

For construction of the coke oven, the refractories 5 are laid in one horizontal direction by the workers 7. The laying accuracy is checked after completion of laying work for one layer of the refractories 5. If a problem is found by the checking, the corresponding part is laid again to correct the problem. Then, laying work for the next layer begins. The coke oven construction is completed by repeating this process.

The image capturing device 2 is for acquiring an image of the work area where oven construction work is in progress. The image capturing device 2 is preferably one that is capable of capturing information about the entire work area 6 with high precision. For example, a 4K camera is suitable for use here. The image capturing device 2 may be an infrared laser sensor, a 3D stereo camera, or any other device capable of acquiring image information with resolution which is sufficient for use in flow line analysis.

A video control unit 8 that performs, for example, image processing is connected to the image capturing device 2. The video control unit 8 functions as a measurement region determining means for automatically determining a measurement region for checking of laying accuracy, and performs, for example, flow line analysis. The video control unit 8 may be incorporated in the image capturing device 2.

The refractory position measuring device 3 is configured to measure a distance to the upper surface and/or side surface of the laid refractory 5 at multiple points. The refractory position measuring device 3 includes a control unit that determines refractory laying accuracy from the results of measurement.

Since the refractory position measuring device 3 measures the positions of refractories at a distance of about 10 m to 100 m therefrom, it is preferable to use, for example, a 3D scanner, a stereo camera, or a TOF camera as the refractory position measuring device 3. A 3D scanner, which is most preferable among them, is a three-dimensional shape measuring device (sensor) that measures the distance to each point, and is capable of using, for example, laser, electromagnetic radar, or ultrasound. A laser type 3D scanner is most preferable in that it is capable of setting a large measurement region, and has a high point-to-point resolution and high distance resolution.

For measurement of positions, even when there is some distance to the measurement points, it is desirable that the distance between points be adjusted to 20 mm or less. When a 3D scanner is used as the refractory position measuring device 3, adjusting the point-to-point distance involves, for example, reducing the height of the 3D scanner (i.e., distance or range to the measurement point), as well as adjusting the settings of the 3D scanner (sampling speed, oscillation speed, and laser intensity). Accordingly, there may be provided a mechanism that is capable of lowering the 3D scanner, for example, about 10 m from the crane 4.

As described above, the refractory position measuring device 3, such as a 3D scanner, is attached to the moving mechanism, such as a crane. The refractory position measuring device 3 can thus be moved to a position directly above the area for checking the laying accuracy. The refractory position measuring device 3 may, however, be secured in place above the work area.

An exemplary inspection method for coke oven construction will now be described.

Figure 2:
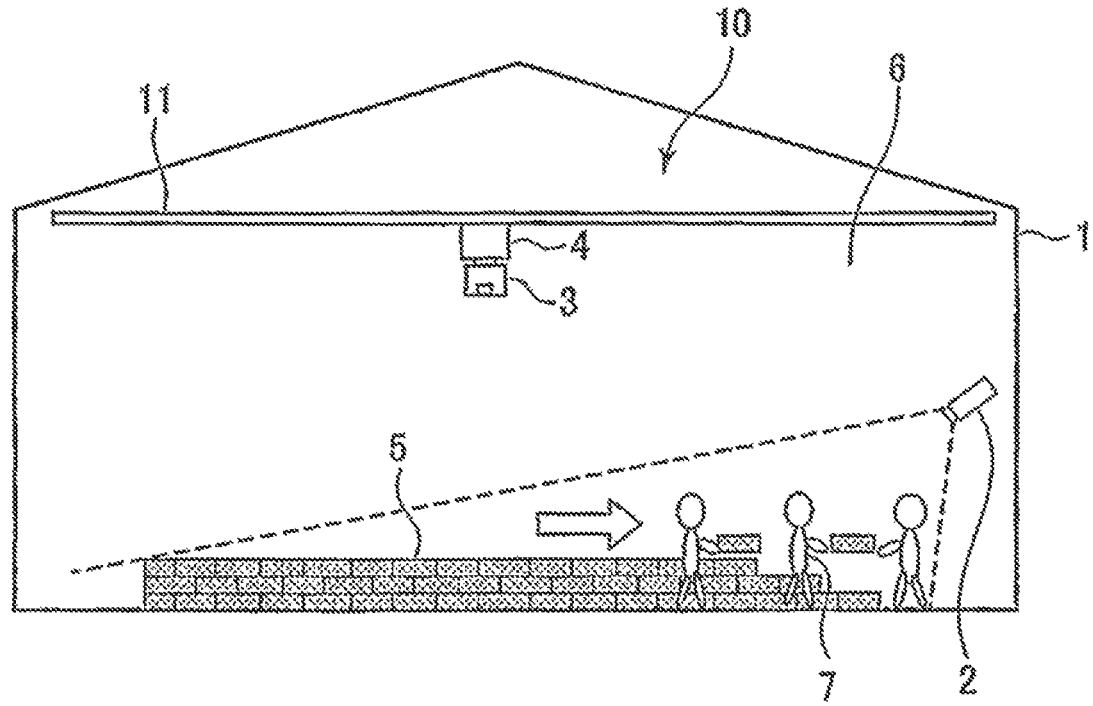
FIG. 2 is a diagram for explaining a first step of an exemplary inspection method performed, for coke oven construction, by the inspection apparatus illustrated in FIG. 1.

First, as illustrated in FIG. 2, the image capturing device 2 acquires an image of the work area 6 where laying work is being carried out by the workers 7 in order from an end (step 1).

Figure 3:
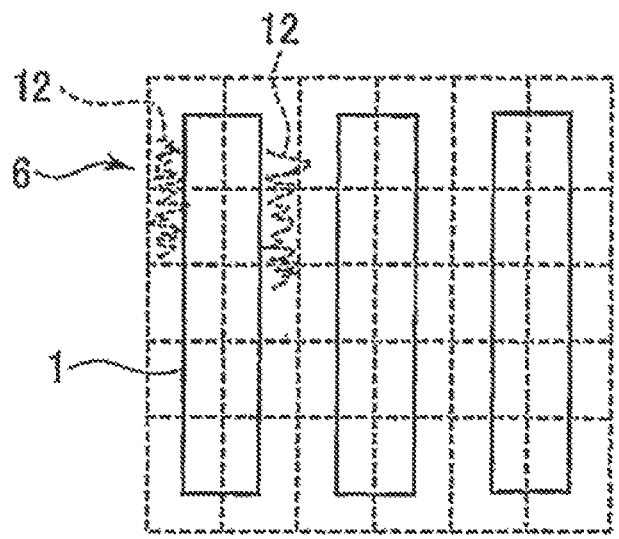
FIG. 3 is a diagram for explaining a second step of the exemplary inspection method performed, for coke oven construction, by the inspection apparatus illustrated in FIG. 1.

Next, as illustrated in FIG. 3, the video control unit 8 performs flow line analysis on the acquired image to identify a work-completed area where the laying work has been completed (step 2). The video control unit 8 thus determines the identified work-completed area as a measurement region for which laying accuracy is to be measured. The details of the flow line analysis will be described later on below. Note that reference numeral 12 in FIG. 3 denotes a flow line of a moving object.

Figure 4:
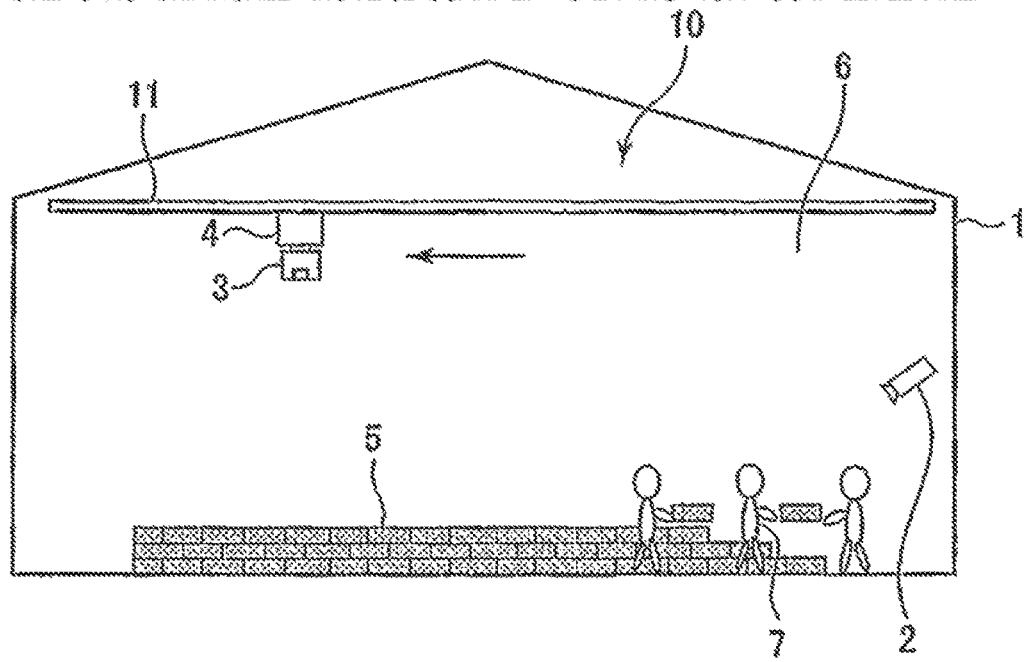
FIG. 4 is a diagram for explaining a third step of the exemplary inspection method performed, for coke oven construction, by the inspection apparatus illustrated in FIG. 1.

Next, as illustrated in FIG. 4, the crane 4 automatically moves the refractory position measuring device 3 to the measurement region on the basis of the result of the flow line analysis (step 3).

Figure 5:
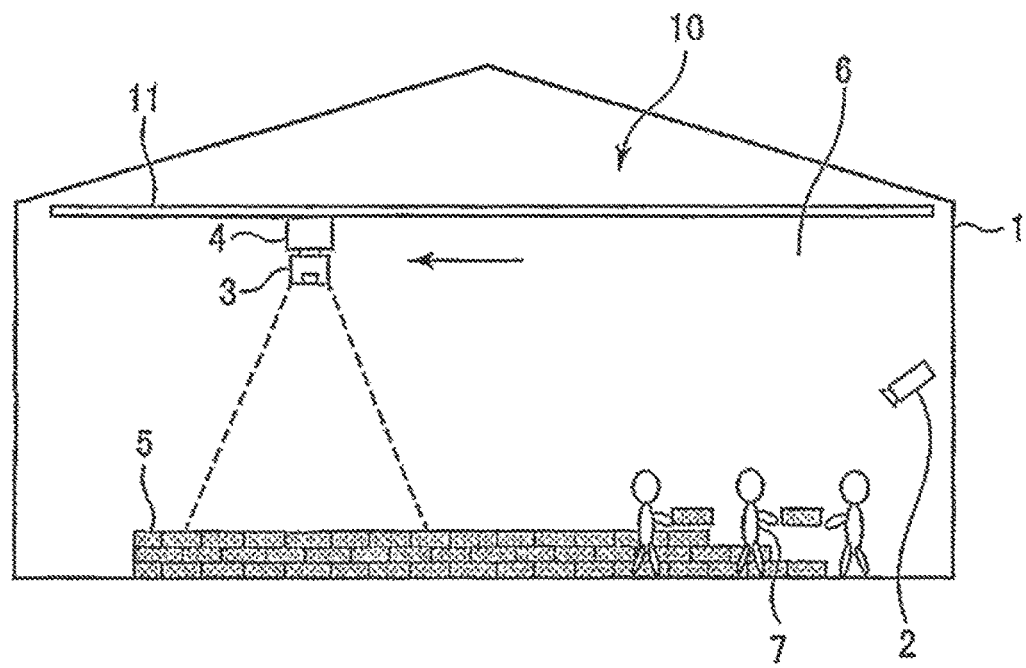
FIG. 5 is a diagram for explaining a fourth step of the exemplary inspection method performed, for coke oven construction, by the inspection apparatus illustrated in FIG. 1.

Next, as illustrated in FIG. 5, the refractory position measuring device 3 checks the laying accuracy in the measurement region (step 4).

As described above, the image capturing device 2 acquires an image of the work area 6 in step 1. This is to determine the measurement region for which measurement is to be made by the refractory position measuring device 3. The actual determination of the measurement region is made by flow line analysis performed on the acquired image by the video control unit 8. In the flow line analysis of laying work for a firing chamber of the coke oven, since it takes about 30 minutes to 1 hour to complete the laying work for one gate, the time required for the image capturing device 2 to acquire the image may be adjusted to the range of about 1 minute to 20 minutes, and preferably to the range of about 5 minutes to 10 minutes.

Figure 6:
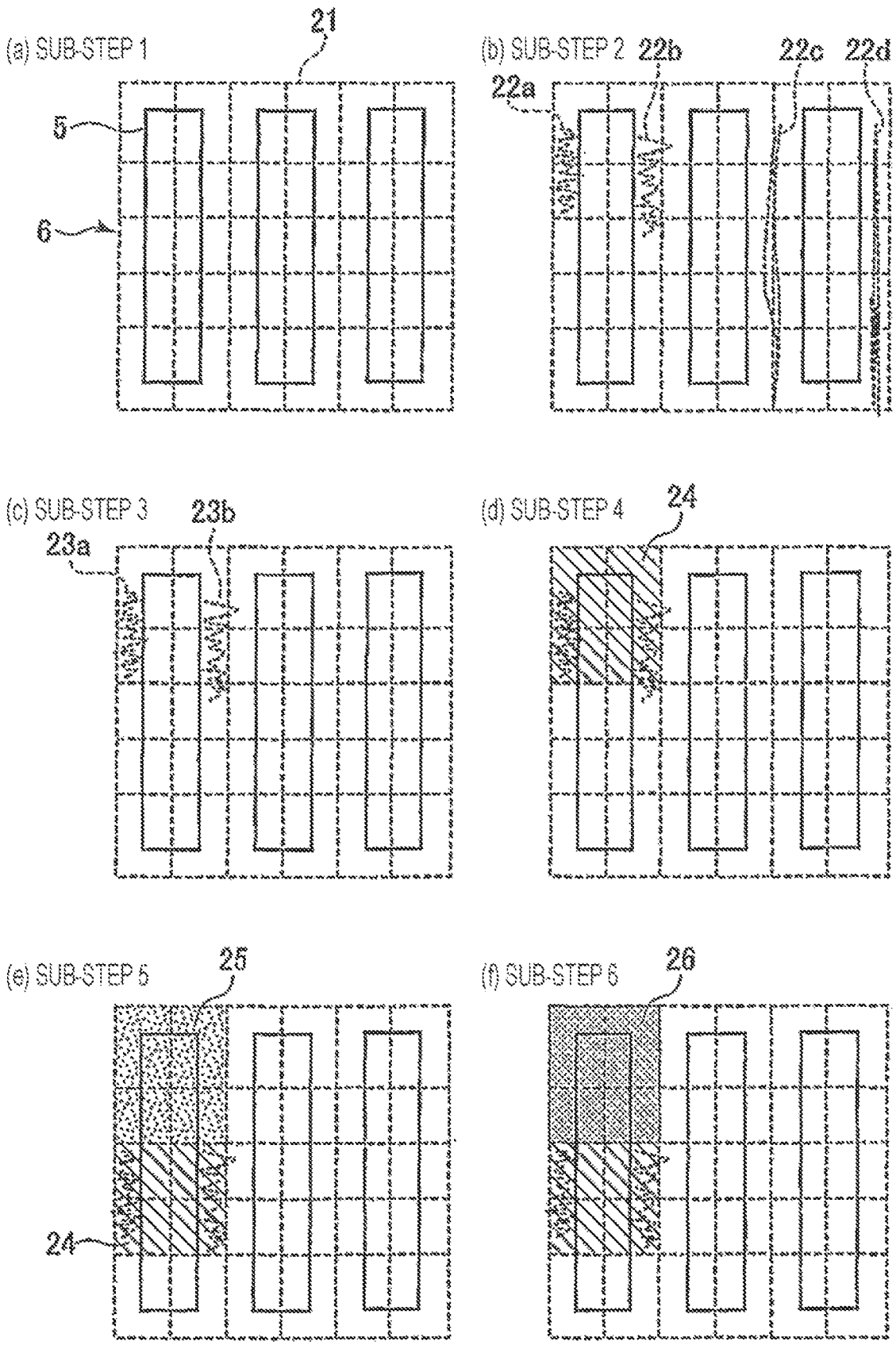
FIG. 6 is a diagram for explaining sub-steps of flow line analysis in step 2.

The flow line analysis in step 2 is performed by sub-steps illustrated in FIG. 6.

First, as illustrated in FIG. 6(*a*), the work area 6 is divided into a plurality of subareas 21 (sub-step 1). The work area 6 is divided in any manner into the subareas 21, which are set to any size that facilitates the analysis.

Next, as illustrated in FIG. 6(b), the video control unit 8 extracts flow lines 22a to 22d of moving objects from the image of the work area 6 captured by the image capturing device 2 for a predetermined period of time (sub-step 2).

From among the flow lines 22a to 22d of the moving objects, the video control unit 8 identifies, as illustrated in FIG. 6(c), flow lines 23a and 23b of the workers (oven construction workers) 7 currently at laying work, on the basis of the patterns of movement of the moving objects, or by using markers attached to helmets worn by the workers 7 (sub-step 3). Although the flow lines of workers are identified from among the flow lines of moving objects in sub-steps 2 and 3, the flow lines of workers may be directly extracted on the basis of positioning devices, such as GPS devices, carried by the workers.

Next, the video control unit 8 determines whether the flow line of the worker 7 included in a subarea is longer than or equal to a threshold. If the flow line of the worker 7 at work in the subarea is longer than or equal to the threshold, the video control unit 8 determines, as illustrated in FIG. 6(d), that the subarea is a work-in-progress area 24 (sub-step 4).

The video control unit 8 repeats sub-steps 2 to 4. If, as illustrated in FIG. 6(e), the flow line of the worker 7 at laying work in the subarea has changed from being longer than or equal to the threshold to being shorter than the threshold, the video control unit 8 determines that the subarea is a work-completed area 25 (sub-step 5).

Next, a laying accuracy checking step (described below) is performed in a concurrent manner. If one of the plurality of work-completed areas 25 (subareas) is an area for which information about completion of laying accuracy determination (described below) has been received from the control unit of the refractory position measuring device 3, the video control unit 8 determines that the subarea is an inspection-completed area 26, as illustrated in FIG. 6(f). The video control unit 8 then determines whether all the subareas are inspection-completed areas 26 (sub-step 6). The analysis ends when all the subareas become inspection-completed areas 26.

Figure 7:
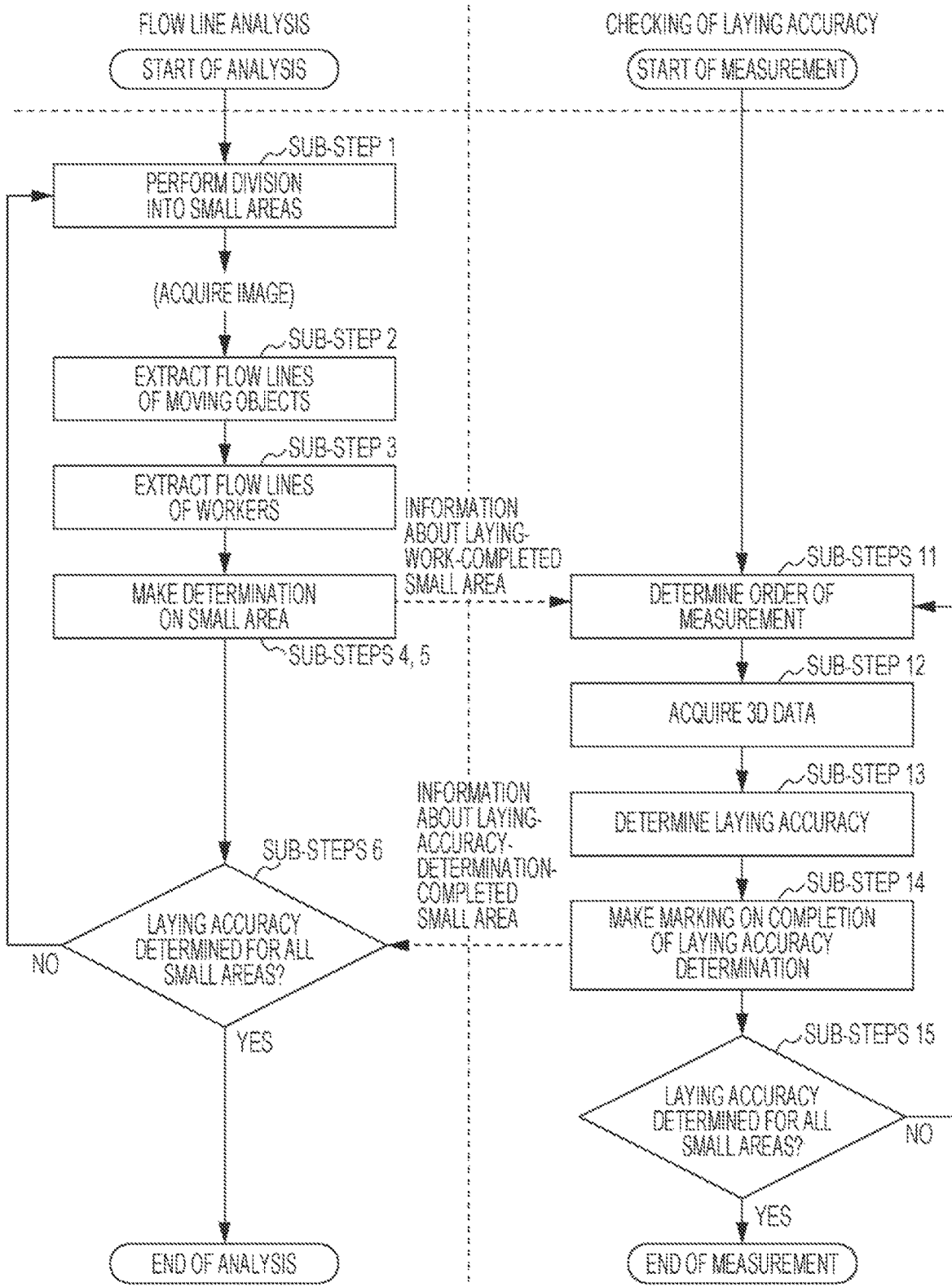
FIG. 7 is a flowchart illustrating sub-steps of laying accuracy checking in step 4, along with sub-steps of flow line analysis in step 2.

The checking of laying accuracy in step 4 is carried out by sub-steps illustrated in the flowchart of FIG. 7. The sub-steps of the flow line analysis illustrated in FIG. 6 are also shown in FIG. 7.

From the video control unit 8 connected to the image capturing device 2, the control unit of the refractory position measuring device 3 receives information about a subarea that has become a work-completed area. The control unit of the refractory position measuring device 3 then determines the order in which a plurality of work-completed areas are to be subjected to measurement of laying accuracy, and determines the work-completed areas as measurement regions sequentially in the determined order (sub-step 11). The order, described above, may be the order in which the subareas became work-completed areas, or may be determined in such a manner as to minimize the distance traveled by the crane 4.

Next, the refractory position measuring device 3 measures the positions of refractories laid in the work-completed area determined as a measurement region, and acquires measurement data (3D data) (sub-step 12). The control unit of the refractory position measuring device 3 then compares the measurement data to a design value to determine laying accuracy (sub-step 13). After the determination of laying accuracy, the subarea (work-completed area) becomes an inspection-completed area and is marked (sub-step 14).

Information about the subarea for which the determination of laying accuracy has been completed is transmitted to the video control unit 8 connected to the image capturing device 2.

Sub-steps 11 to 14 are repeated to determine whether all subareas have become inspection-completed areas (sub-step 15). If it is determined that all subareas have become inspection-completed areas, the measurement made by the refractory position measuring device (3D scanner) 3 ends.

The refractory position measuring device (3D scanner) 3 measures the positions of refractories in multiple areas and combines past measurement data with the latest measurement data. The data is combined by setting reference points (markers) in a structure secured in the oven construction work area and adding the positions of the reference points to the set reference points. Three or more reference points are set here.

In the present embodiment, the refractory position measuring device 3 remotely measures the laying accuracy of refractories. This prevents interference between the measurement of laying accuracy and other processes, and allows highly efficient and accurate checking of laying accuracy at the oven construction site. It is thus possible to improve efficiency of oven construction work. On the basis of the image of the work area 6 acquired by the image capturing device 2, the video control unit 8 performs, for example, flow line analysis to automatically determine the progress of oven construction work, and automatically measure the area where the laying work has been completed. It is thus possible to automatically determine the area (measurement region) for which the laying accuracy is to be checked by the refractory position measuring device 3.

Examples of a known technique that measures and inspects a large structure without requiring manual work include (though not in the same field as the disclosed embodiments) a technique in which a distance measuring device mounted on a mobile robot measures the dimensions of an object (see, e.g., Japanese Unexamined Patent Application Publication No. 10-227639), and a technique which involves using a portable near-infrared electro-optical distance measuring device to remotely measure the dimensions of an object (see, e.g., Japanese Unexamined Patent Application Publication No. 5-120413).

In the technique described in Japanese Unexamined Patent Application Publication No. 10-227639, the mobile robot performs measurement in a work area. This leads to inefficient operation, because the measurement needs to be timed to avoid interference with other processes. The technique described in Japanese Unexamined Patent Application Publication No. 5-120413 does not cause interference with other processes. However, the distance measuring device needs to be installed at a different location for each measurement, and this requires additional workers.

In the present embodiment, the refractory position measuring device 3 is capable of remote measurement which does not cause interference with other processes, and is also capable of automatic measurement which does not require additional workers.

Disclosed embodiments described above are merely for illustrative purposes and are not meant to be limiting. The embodiments described above may be omitted, replaced, or changed in various forms without departing from the scope of the disclosed embodiments.

For example, although a three-dimensional shape measuring device, such as a 3D scanner, is used as the refractory position measuring device in the embodiments described above, the refractory position measuring device is not limited to this. For example, a distance measuring device, such as a two-dimensional laser displacement meter, may be used. In the example described above, a crane installed in the plant is used as the moving device 4 for moving the refractory position measuring device. However, the moving mechanism is not limited to the crane, and any means is applicable as long as it is movable in a horizontal plane in the oven construction plant building. For example, a parallel wire mechanism used in indoor and outdoor stadiums and gymnasiums may be used. Although the refractory position measuring device 3 includes the control unit that determines the refractory laying accuracy in the embodiments described above, a separate determining device, including a computer, may be provided which determines refractory laying accuracy. Alternatively, the video control unit 8 may be a computer that determines refractory laying accuracy.

EXAMPLE

A 4K camera was used as the image capturing device, and a laser type 3D scanner (3D laser scanner) was used as the refractory position measuring device. As illustrated in FIG. 1, the 4K camera was installed on the wall of the building, and the 3D laser scanner was attached to the overhead traveling crane. The 4K camera captured an image of the oven construction work area where monolithic refractories were laid as the refractories. The video control unit performed flow line analysis on the image captured for the past five minutes to determine, every five minutes, whether there was a worker. If a worker was found, the video control unit determined, on the basis of characteristics such as moving speed and arm movement, whether the worker was an oven construction worker who performs laying work, an arranging worker who transports refractories, or a jointing worker who repairs joints and performs cleaning. An area where an oven construction worker was present for three or more minutes, out of five minutes, was determined to be a work-in-progress area. Then, after the oven construction worker left the area (or work-completed area), an operator moved the overhead traveling crane having the 3D laser scanner attached thereto to a location three to five gates off the point directly above the work-completed area, so as to carry out measurement. Since each measurement allows only one side of monolithic refractories to be measured, the overhead traveling crane was moved to the opposite side three to five gates off the point directly above the work-completed area, so as to make another measurement. The height from the monolithic refractories to the overhead traveling crane was about 15 m.

For point group information obtained by the two separate measurements, data was combined to make three reference points coincide. Since point group data has a measurement error of about 1 mm, it is difficult to make the three reference points perfectly coincide. Accordingly, a least-squares method was used to combine the data in such a manner as to minimize the displacement between reference points.

Points obtained by measuring the surfaces of refractories for which the laying positions were to be measured, were extracted from measurement points in the combined data. Then the distances to brick surfaces in CAD data (design values) were measured, and average values were calculated to measure the positions of laid refractories. The measurement was performed on monolithic refractories (A to E) for five gates each at three points, including both ends (north end and south end) and center, and deviation from the design value was evaluated. The results are shown in Table 1. For comparison, Table 2 shows values obtained by manual measurement made at the same points as above by a measurer.

Table 1 shows that when the measurement was performed in accordance with the disclosed embodiments, a deviation from the design value was from −1.3 mm to 1.4 mm. Table 2 shows that in the manual measurement, a deviation from the design value was from −2.0 mm to 0.5 mm. The difference between the example of the disclosed embodiments and the manual measurement was a maximum of 1.6 mm. This shows that with the disclosed embodiments, the distance to refractories can be measured with relatively high accuracy, and laying accuracy checking can be made.

TABLE 1

| | | | Monolithic Refractories | | | | |
| | | | A | B | C | D | E |
|---|---|---|---|---|---|---|---|
| Example | Measurement Location | North End | 1.0 mm | 0.3 mm | −0.7 mm | 0.8 mm | −0.2 mm |
| | | Center | −1.3 mm | −0.9 mm | −0.6 mm | −0.4 mm | 1.4 mm |
| | | South End | 0.3 mm | 1.1 mm | 0.5 mm | −1.2 mm | 1.2 mm |

TABLE 2

| | | | Monolithic Refractories | | | | |
| | | | A | B | C | D | E |
|---|---|---|---|---|---|---|---|
| Manual Measurement | Measurement Location | North End | −0.5 mm | −1.0 mm | −1.0 mm | −0.5 mm | −1.0 mm |
| | | Center | −2.0 mm | −1.0 mm | −2.0 mm | −2.0 mm | 0.0 mm |
| | | South End | −1.0 mm | −0.5 mm | 0.5 mm | −2.0 mm | 0.0 mm |

The invention claimed is:

1. An inspection apparatus for coke oven construction, the inspection apparatus configured to check a laying accuracy after refractories are laid in oven construction work for updating or newly creating a coke oven that produces coke, the inspection apparatus comprising:
   an image capturing sensor configured to acquire an image of a work area where oven construction work is in progress;
   a video processor configured to identify a work-completed area where laying work has been completed on the basis of the image of the work area acquired by the image capturing sensor, and to determine the identified work-completed area as a measurement region; and a 3D scanner configured to check the laying accuracy by measuring positions of laid refractories in the measurement region determined by the video processor.

2. The inspection apparatus for coke oven construction according to claim 1, wherein the video processor performs flow line analysis on the image of the work area acquired by the image capturing sensor to identify the work-completed area and determine the measurement region.

3. The inspection apparatus for coke oven construction according to claim 1, further comprising a moving mechanism configured to move the 3D scanner above the work area.

4. The inspection apparatus for coke oven construction according to claim 3, wherein the moving mechanism is an overhead traveling crane.

5. The inspection apparatus for coke oven construction according to claim 1, wherein the 3D scanner measures a distance to at least one of an upper surface and a side surface of each laid refractory at multiple points to determine the positions of the laid refractories.

6. An inspection method for coke oven construction, the inspection method being a method for checking a laying accuracy after refractories are laid in oven construction work for updating or newly creating a coke oven that produces coke, the inspection method comprising:
    acquiring an image of a work area where oven construction work is in progress;
    identifying a work-completed area where laying work has been completed on the basis of the image of the work area, and determining the identified work-completed area as a measurement region; and
    checking the laying accuracy, using 3D scanner, by measuring positions of laid refractories in the determined measurement region.

7. The inspection method for coke oven construction according to claim 6, wherein the step of determining the measurement region includes performing flow line analysis on the image of the work area to identify the work-completed area.

8. The inspection method for coke oven construction according to claim 7, wherein the step of determining the measurement region includes:
    dividing the work area into a plurality of subareas;
    extracting flow lines of workers from the image of the work area;
    determining, from the extracted flow lines of workers, whether each subarea is the work-completed area or a work-in-progress area where laying work is in progress; and
    determining the work-completed area as the measurement region.

9. The inspection method for coke oven construction according to claim 8, further comprising:
    determining, as an inspection-completed area, the measurement region for which the checking of the laying accuracy has been completed; and
    determining whether all of the subareas in the work area are inspection-completed areas,
    wherein the measurement is terminated upon determining that all of the subareas are inspection-completed areas.

10. A coke oven construction method for updating or newly creating a coke oven that produces coke, the coke oven construction method comprising repeating:
    laying refractories; and
    checking the laying accuracy of the laid refractories by using the inspection method according to claim 9.

11. A coke oven construction method for updating or newly creating a coke oven that produces coke, the coke oven construction method comprising repeating:
    laying refractories; and
    checking the laying accuracy of the laid refractories by using the inspection method according to claim 7.

12. A coke oven construction method for updating or newly creating a coke oven that produces coke, the coke oven construction method comprising repeating:
    laying refractories; and
    checking the laying accuracy of the laid refractories by using the inspection method according to claim 8.

13. The inspection method for coke oven construction according to claim 6, wherein the checking of the laying accuracy involves using the 3D scanner configured to measure positions of the laid refractories in the measurement region, and after the work-completed area is identified, the 3D scanner is moved to the identified work-completed area to check the laying accuracy.

14. A coke oven construction method for updating or newly creating a coke oven that produces coke, the coke oven construction method comprising repeating:
    laying refractories; and
    checking the laying accuracy of the laid refractories by using the inspection method according to claim 13.

15. The inspection method for coke oven construction according to claim 6, wherein the checking of the laying accuracy includes:
    measuring positions of the laid refractories in the measurement region to acquire measurement data; and
    comparing the measurement data to a design value to determine the laying accuracy.

16. A coke oven construction method for updating or newly creating a coke oven that produces coke, the coke oven construction method comprising repeating:
    laying refractories; and
    checking the laying accuracy of the laid refractories by using the inspection method according to claim 15.

17. A coke oven construction method for updating or newly creating a coke oven that produces coke, the coke oven construction method comprising repeating:
    laying refractories; and
    checking the laying accuracy of the laid refractories by using the inspection method according to claim 6.

* * * * *